(12) United States Patent
Zeh et al.

(10) Patent No.: US 11,901,705 B2
(45) Date of Patent: Feb. 13, 2024

(54) ELECTRODE TIP ASSEMBLY FOR A SPARK PLUG AND METHOD OF MANUFACTURING THE SAME

(71) Applicant: FEDERAL-MOGUL IGNITION GMBH, Neuhaus-Schierschnitz (DE)

(72) Inventors: Andreas Zeh, Sonneberg (DE); Rene Trebbels, Erkelenz (DE); John Antony Burrows, Manchester (GB)

(73) Assignee: FEDERAL-MOGUL IGNITION GMBH, Industriestrasse (DE)

( * ) Notice: Subject to any disclaimer, the term of this patent is extended or adjusted under 35 U.S.C. 154(b) by 0 days.

(21) Appl. No.: 17/870,780

(22) Filed: Jul. 21, 2022

(65) Prior Publication Data

US 2023/0198232 A1 Jun. 22, 2023

Related U.S. Application Data

(60) Provisional application No. 63/224,494, filed on Jul. 22, 2021.

(51) Int. Cl.
*H01T 21/02* (2006.01)
*H01T 13/39* (2006.01)
*B33Y 80/00* (2015.01)

(52) U.S. Cl.
CPC .......... *H01T 13/39* (2013.01); *H01T 21/02* (2013.01); *B33Y 80/00* (2014.12)

(58) Field of Classification Search
CPC .......... H01T 13/39; H01T 21/02; B33Y 80/00
USPC ....................................... 313/141
See application file for complete search history.

(56) References Cited

U.S. PATENT DOCUMENTS

| | | |
|---|---|---|
| 6,621,198 B2 | 9/2003 | Kanao et al. |
| 7,385,339 B2 | 6/2008 | Lineton et al. |
| 7,385,355 B2 | 6/2008 | Kusunoki et al. |
| 7,569,979 B2 | 8/2009 | Lykowsi et al. |
| 7,795,790 B2 | 9/2010 | Lineton |
| 9,806,500 B2 | 10/2017 | Sakairi et al. |
| 9,853,423 B1 | 12/2017 | Sumoyama et al. |
| 10,744,590 B2 | 8/2020 | Maier et al. |
| 10,897,123 B2 | 1/2021 | Abe |
| 10,913,257 B2 | 2/2021 | Coupland et al. |
| 2006/0028106 A1 | 2/2006 | Lineton |
| 2014/0170598 A1 | 6/2014 | Abend |

(Continued)

FOREIGN PATENT DOCUMENTS

| | | |
|---|---|---|
| CN | 103094842 A | 5/2013 |
| CN | 203387050 U | 1/2014 |

(Continued)

OTHER PUBLICATIONS

US 10,576,577, Jun. 14, 2007, Didier Le Breis (withdrawn).

*Primary Examiner* — Christopher M Raabe
(74) *Attorney, Agent, or Firm* — REISING ETHINGTON P.C.

(57) ABSTRACT

An electrode tip assembly for a spark plug includes an electrode tip that is formed on an electrode base using an additive manufacturing process, such as a powder bed fusion technique, after which the electrode base is welded to an electrode body. The electrode base includes a welding side and an additive manufacturing side, and the electrode tip includes a plurality of laser deposition layers built on the additive manufacturing side of the electrode base.

30 Claims, 11 Drawing Sheets

(56) References Cited

U.S. PATENT DOCUMENTS

| | | | |
|---|---|---|---|
| 2016/0064903 A1* | 3/2016 | Deguchi | H01T 13/32 313/120 |
| 2017/0252854 A1 | 9/2017 | Maier et al. | |
| 2019/0366585 A1 | 12/2019 | Nagai et al. | |
| 2020/0207069 A1* | 7/2020 | Coupland | B22F 7/08 |
| 2021/0086279 A1 | 3/2021 | Clover et al. | |
| 2021/0151959 A1* | 5/2021 | Grabner | H01T 13/20 |
| 2021/0273417 A1 | 9/2021 | Ritter et al. | |
| 2022/0140576 A1 | 5/2022 | Niessner et al. | |
| 2022/0149598 A1 | 5/2022 | Trebbels | |
| 2022/0360053 A1* | 11/2022 | Niessner | H01T 13/39 |
| 2023/0231365 A1* | 7/2023 | Konig | H01T 21/02 313/46 |

FOREIGN PATENT DOCUMENTS

| | | |
|---|---|---|
| CN | 103457160 B | 3/2017 |
| CN | 107891200 A | 4/2018 |
| CN | 109130168 A | 1/2019 |
| CN | 109332694 A | 2/2019 |
| CN | 110899695 A | 3/2020 |
| DE | 102012223239 A1 | 6/2014 |
| DE | 102016209094 A1 | 11/2017 |
| DE | 102017221136 A1 | 5/2019 |
| DE | 102017221137 A1 | 5/2019 |
| DE | 102018212894 A1 | 2/2020 |
| EP | 2727898 A1 | 5/2014 |
| FR | 3095149 A1 | 10/2020 |
| JP | 2002359053 A | 12/2002 |
| JP | 2009270130 A | 11/2009 |
| KR | 100400101 B1 | 9/2003 |
| WO | 2005025783 A1 | 3/2005 |
| WO | 2006017687 A2 | 2/2006 |
| WO | 2013128416 A2 | 9/2013 |
| WO | 2015173790 A1 | 11/2015 |
| WO | WO2019025796 A1 | 2/2019 |

* cited by examiner

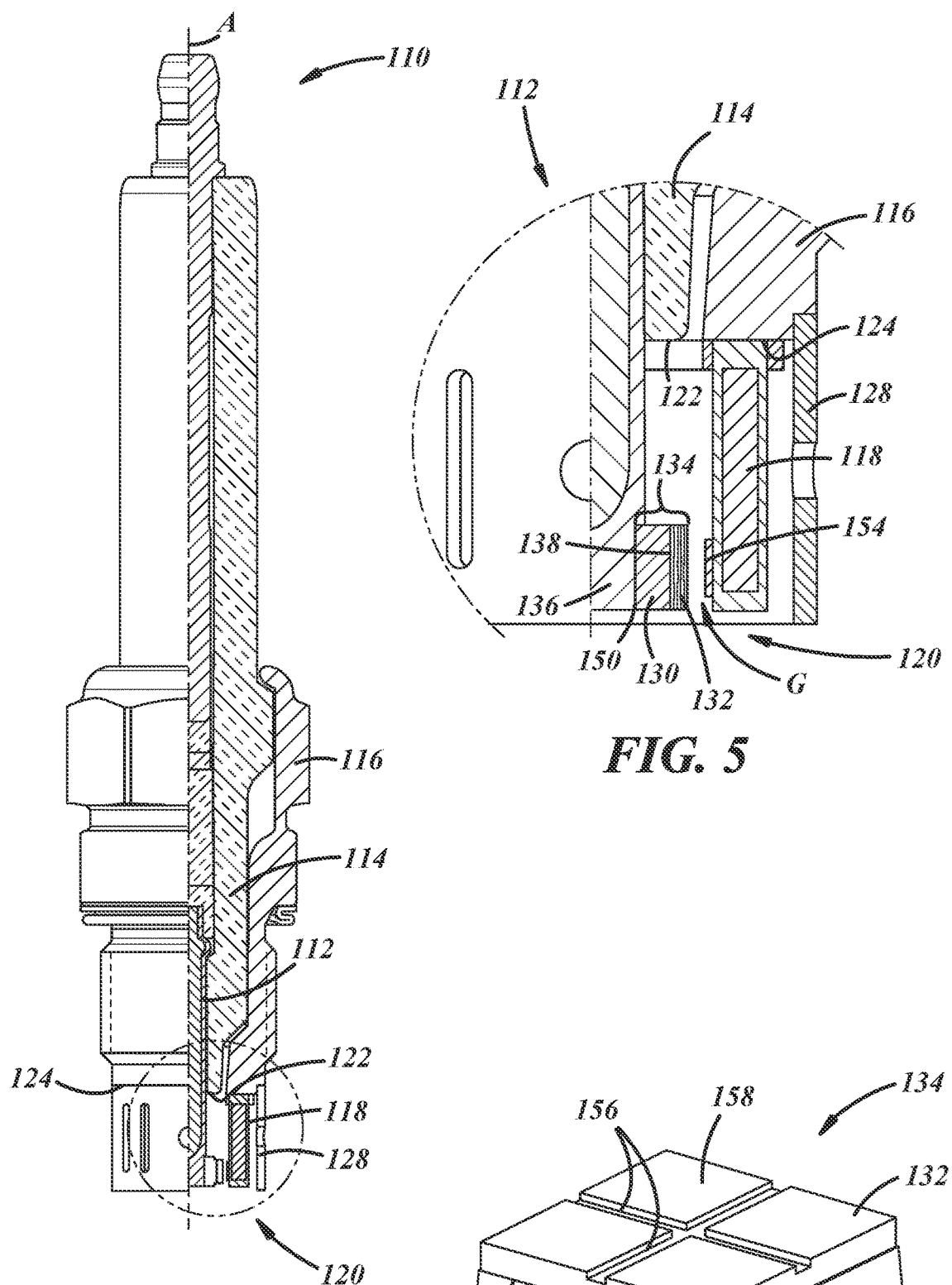

ELECTRODE TIP ASSEMBLY FOR A SPARK PLUG AND METHOD OF MANUFACTURING THE SAME

RELATED APPLICATIONS

This application claims the benefit of U.S. Provisional Application No. 63/224,494, filed Jul. 22, 2021, the entire contents of which are herein incorporated by reference.

FIELD

The present invention generally relates to spark plugs and other ignition devices and, in particular, to spark plug electrode tip assemblies and other components that are made using additive manufacturing processes.

BACKGROUND

Spark plugs are used to initiate combustion in internal combustion engines. Typically, spark plugs ignite an air/fuel mixture in a combustion chamber by producing a spark across a spark gap between two or more electrodes. The ignition of the air/fuel mixture by means of the spark triggers a combustion reaction in the combustion chamber, which is responsible for the power stroke of the engine. The high temperatures, the high electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

To reduce erosion and/or corrosion of the electrodes, various kinds of precious metals and alloys have been used, such as those having platinum and iridium. These materials are expensive, however. Consequently, the manufacturers of spark plugs try to minimize the quantity of precious metals used in an electrode. One approach involves using precious metals only on an electrode tip or on a sparking section of the electrodes, i.e., in the place where a spark jumps across the spark gap, as opposed to the entire electrode body itself.

Various joining techniques, such as brazing, resistance welding, laser welding, etc. have been used for attaching a precious metal electrode tip to an electrode body. However, when a precious metal tip is joined to an electrode body, such as a body made from a nickel alloy, there can be a substantial amount of thermal and/or other stresses on the joint during operation due to the different properties of the materials (e.g., different coefficients of thermal expansion, different melting temperatures, etc.). These stresses, in turn, can undesirably lead to cracking or other damage to the electrode body, the electrode tip, the joint connecting the two components, or a combination thereof.

SUMMARY

According to one embodiment, there is provided an electrode tip assembly for a spark plug, comprising: an electrode base that includes a welding side and an additive manufacturing side; and an electrode tip that is formed on the electrode base, wherein the electrode tip includes a plurality of laser deposition layers and is built on the additive manufacturing side of the electrode base.

In accordance with various embodiments, the electrode tip assembly may have any one or more of the following features, either singly or in any technically feasible combination:

the electrode base includes a nickel-based material and the electrode tip includes a precious metal-based material;

the precious metal-based material is an iridium-based material;

the electrode base further includes manufactured sides and processed sides, the welding side is configured to be welded to an electrode body, the additive manufacturing side is configured to provide a surface upon which the electrode tip is built up, the manufactured sides extend between the welding side and the additive manufacturing side and correspond with a thickness of the electrode base, and the processed sides also extend between the welding side and the additive manufacturing side and correspond with a thickness of the electrode base;

the manufactured sides include extruded or drawn surfaces and the processed sides include cut or severed surfaces;

the processed sides are perpendicular to at least one of the welding side and/or the additive manufacturing side, and the manufactured sides are slightly angled with respect to at least one of the welding side and/or the additive manufacturing side and lean inwards such that a width dimension of the additive manufacturing side is slightly smaller than a width dimension of the welding side;

the welding side of the electrode base includes one or more welding feature(s) that extend or protrude from the welding side and are configured to assist with welding;

the welding feature(s) include a plurality of short cylindrical posts that extend from the welding side;

the welding side of the electrode base includes one or more cut or sliced surfaces;

the electrode base has an overall thickness that is at least 25% thicker than an overall thickness of the electrode tip;

the electrode base includes a generally homogeneous nickel-based composition that extends across a single material layer, and the electrode tip includes a plurality of laser deposition layers sequentially built on top of each other;

the electrode tip is made by additive manufacturing, which uses a powder bed fusion technique to melt or sinter precious metal-based powder onto the electrode base with a laser or electron beam, and then to allow the melted or sintered powder to solidify;

the electrode tip includes one or more grooves or channels formed thereon by additive manufacturing;

the electrode tip is bonded to the electrode base at an interfused boundary with a whole area connection that extends across an entire area of the interfused boundary between the electrode tip and the electrode base and does not include a weld joint;

the electrode tip assembly does not include a welded boundary between substantially dissimilar materials;

a spark plug, comprising: a shell that includes an axial bore; an insulator that is disposed in the shell axial bore and includes an axial bore; a center electrode that is disposed in the insulator axial bore and includes an electrode body; a ground electrode that is attached to the shell and includes an electrode body; and the electrode tip assembly of claim 1, wherein the welding side of the electrode base of the electrode tip assembly is welded to at least one of the ground electrode body or the center electrode body.

According to another embodiment, there is provided an electrode strip assembly for use in manufacturing a spark plug, comprising: an electrode base in the form of an elongated strip that includes a welding side and an additive manufacturing side; and a plurality of electrode tips that are formed on the elongated strip in a row, wherein each of the electrode tips includes a plurality of laser deposition layers and is built on the additive manufacturing side of the elongated strip.

According to another embodiment, there is provided an electrode sheet assembly for use in manufacturing a spark plug, comprising: an electrode base in the form of a sheet that includes a welding side and an additive manufacturing side; and a plurality of electrode tips that are formed on the sheet in an array of rows and columns, wherein each of the electrode tips includes a plurality of laser deposition layers and is built on the additive manufacturing side of the sheet.

According to yet another embodiment, there is provided a method for manufacturing a spark plug, comprising the steps of: providing an electrode base having a welding side and an additive manufacturing side; providing powder that includes a precious metal-based material; positioning the electrode base in a tool such that the powder covers the additive manufacturing side; building one or more electrode tip(s) on the additive manufacturing side of the electrode base through the use of an additive manufacturing process; and welding the welding side of the electrode base to an electrode body.

DRAWINGS

Preferred embodiments will hereinafter be described in conjunction with the appended drawings, wherein like designations denote like elements, and wherein:

FIG. 4 is a partial cross-sectional view of a spark plug according to another embodiment of the present disclosure;

FIG. 5 is an enlarged partial cross-sectional view of a portion of the spark plug of FIG. 4, where the firing end has an electrode tip that is built onto an electrode base via an additive manufacturing process;

FIG. 6 is a perspective view of an electrode tip assembly, such as the one shown in FIG. 5, where the electrode tip is built onto the electrode base via an additive manufacturing process and includes a number of grooves or channels;

DESCRIPTION

Figures 1, 2, 3:
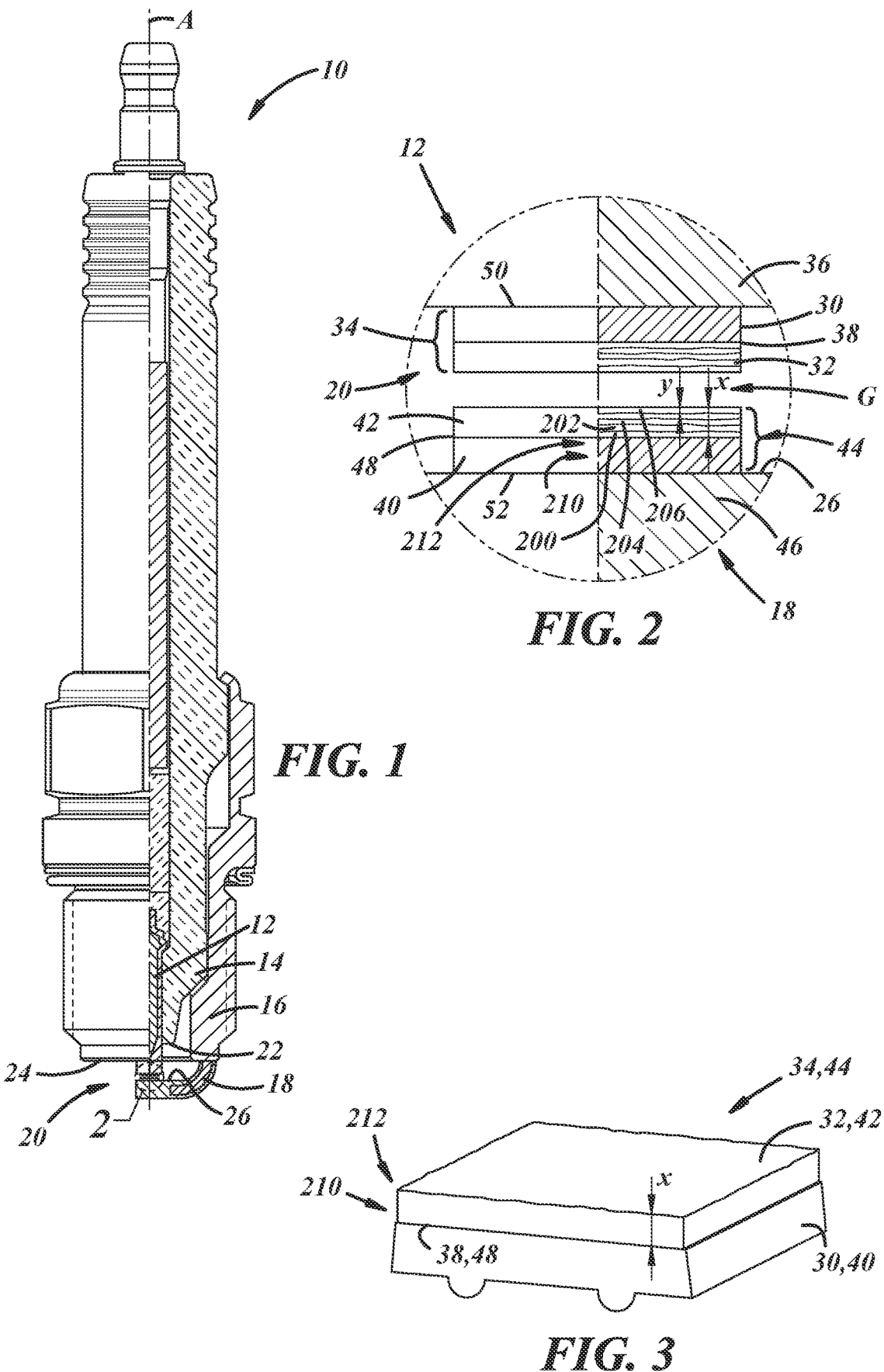
FIG. 1 is a partial cross-sectional view of a spark plug according to an embodiment of the present disclosure.
FIG. 2 is an enlarged partial cross-sectional view of a portion of the spark plug of FIG. 1, where the firing end has an electrode tip that is built onto an electrode base via an additive manufacturing process.
FIG. 3 is a perspective view of an electrode tip assembly, such as the one shown in FIG. 2, where the electrode tip is built onto the electrode base via an additive manufacturing process and includes a number of laser deposition layers.

The spark plug electrode tip assembly disclosed herein includes an electrode tip that is formed on an electrode base using an additive manufacturing process, such as a powder bed fusion technique, after which the electrode base is welded to an electrode body. Some non-limiting examples of potential powder bed fusion techniques include: selective laser melting (SLM), selective laser sintering (SLS), direct metal laser sintering (DMLS), electron beam melting (EBM), as well as other rapid prototyping and/or 3D printing techniques.

By way of example, the electrode base may be made of a nickel-based material, while the electrode tip may be made of a precious metal-based material, such as those having iridium, platinum, palladium, ruthenium, etc. The precious metal-based material is selected to improve the resistance of the electrode tip to corrosion and/or electrical erosion. By using an additive manufacturing process to first build the electrode tip on the electrode base (together, the electrode tip and electrode base are referred to as an electrode tip assembly) and then to weld the electrode base to an electrode body, an improved spark plug electrode can be provided.

Those skilled in the art will appreciate that when a conventional precious metal-based electrode tip is joined to a nickel-based electrode body, such as by laser welding, there is typically a substantial amount of thermal and/or other stresses on the joint during operation due to the different properties of the materials (e.g., different coefficients of thermal expansion, different melting temperatures, etc.). These stresses, in turn, can undesirably lead to cracking or other damage to the electrode tip, the electrode body, the joint connecting the two components, or a combination thereof. Furthermore, these challenges are exacerbated in an internal combustion engine, where a spark plug electrode is subjected to harsh conditions and extreme temperature and/or load changes. Conventional precious metal-based electrode tips, particularly those used in industrial applications, typically require a large piece of precious metal to weld the electrode tip to the electrode body, even though only a small portion of the precious metal will actually be used or consumed during the operational lifetime of the spark plug electrode. This increases cost, since the precious metal is typically the most expensive component of the electrode. In addition, welding a conventional precious-metal based electrode tip to an electrode body can be a difficult and expensive manufacturing process, as the extremely high melting temperature of most precious metals typically requires expensive laser welding equipment to sufficiently attach the precious metal-based electrode tip to the nickel-based electrode body. The spark plug electrode described herein, with its electrode tip formed on an electrode base by additive manufacturing, which efficiently enables many electrode tips to be formed on a common electrode base before being cut or severed into separate pieces, and the electrode base subsequently welded to the electrode body, such as by resistance welding, is designed to address these and/or other challenges.

The present electrode tip assembly is designed for use in a wide variety of spark plugs and other ignition devices including automotive spark plugs, industrial plugs, aviation igniters, glow plugs, or any other device that is used to ignite an air/fuel mixture in an engine. This includes, but is certainly not limited to, the exemplary automotive and industrial plugs that are shown in the drawings and are described below. Furthermore, it should be noted that the present electrode tip assembly may be used with a center and/or ground electrode. Other embodiments and applications of the electrode tip assembly are also possible. Unless otherwise specified, all percentages provided herein are in terms of weight percentage (wt %) and all references to axial, radial and circumferential directions are based on the center or longitudinal axis A of the spark plug.

Referring to FIGS. 1 and 2, there is shown an exemplary spark plug 10 that includes a center electrode 12, an insulator 14, a metallic shell 16, and a ground electrode 18. The center electrode 12 is disposed within an axial bore of the insulator 14 and includes a firing end 20 that protrudes beyond a free end 22 of the insulator 14. As explained below in more detail, the firing end 20 may include an electrode base 30 made from a nickel-based material and an electrode tip 32 made from a precious metal-based material, where the electrode tip 32 is formed on the electrode base 30 using an additive manufacturing process (together, the electrode base 30 and the electrode tip 32 are referred to as an electrode tip assembly 34). The electrode tip assembly 34 is then welded to an electrode body 36, such as by resistance welding the electrode base 30 to the electrode body 36 (the electrode base 30, the electrode tip 32, and the electrode body 36, as well as other potential components, collectively make up the spark plug electrode, in this case the center electrode 12). Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may be retracted within the metallic shell 16, as shown, or it may protrude beyond a free end 24 of the metallic shell 16. The ground electrode 18 may be constructed according to the conventional J-gap configuration shown in the drawings or according to some other arrangement, and is attached to the free end 24 of the metallic shell 16. According to this particular embodiment, the ground electrode 18 includes a side surface 26 that opposes the firing end 20 of the center electrode and has an electrode base 40 and an electrode tip 42 that is formed on the electrode base according to an additive manufacturing process (together, the electrode base 40 and the electrode tip 42 are referred to as an electrode tip assembly 44). The electrode tip assembly 44 is then welded to an electrode body 46, such as by resistance welding the electrode base 40 to the electrode body 46 (the electrode tip 40, the electrode base 42, and the electrode body 46, as well as other potential components, collectively make up the spark plug electrode, in this case the ground electrode 18). The electrode tip 42 of the ground electrode defines a spark gap G with the electrode tip 32 of the center electrode such that they provide sparking surfaces for the emission, reception, and exchange of electrons across the spark gap G. The electrode tip assemblies 34 and 44 may be formed from the same materials, they may be formed from different materials, or one of them may be omitted so that the spark plug 10 includes either electrode tip assembly 34 or 44 but not both, to cite several possibilities.

With reference to FIG. 3, an example of an electrode tip assembly 34, 44 is shown before it is attached to a corresponding electrode body 36, 46. In this example, the electrode tip assembly 34, 44 is shown having a square shape, however, it is possible for one or both of the assemblies 34, 44 to have a circular, oval, rectangular or other shape instead. As mentioned above, the electrode tip assembly 34, 44 includes an electrode base 30, 40 with an electrode tip 32, 42 that has been built on the electrode base via an additive manufacturing process, such as a powder bed fusion technique. The example in FIG. 3 has several welding features protruding from an underside of the electrode base 30, 40, as will be explained in greater detail, however, such features are merely optional, as the underside of the electrode base could be flat or smooth instead. After production of the electrode tip assembly 34, 44 via the additive manufacturing process, the electrode tip assembly may then be attached, such as by resistance welding, to the corresponding electrode body 36, 46. Since only the electrode tip 32, 42 is made from precious metal, which is the most expensive and costly portion of the electrode tip assembly 34, 44, the overall material cost of the assembly can be reduced, compared to alternatives where the entire structure is made from precious metal. In addition, the multi-layer structure of the electrode tip assembly 34, 44 helps reduce thermal stresses at inter-material boundaries or junctions, compared to alternatives where a large precious metal tip is directly welded to an electrode body; this is particularly true when the precious metal tip is made from an iridium-based material, which has a very low CTE compared to a typical electrode body material, like Inconel 600 or 601. Providing the electrode base 30, 40, with its intermediate CTE, in between the electrode tip 32, 42 and the electrode body 36, 46 helps break up the large inter-layer CTE difference that would otherwise exist between the electrode tip and the electrode body. Furthermore, building or forming the electrode tip 32, 42 on the electrode base 30, 40 through the use of an additive manufacturing process, results in an interfused boundary 38, 48 between layers. The interfused boundaries 38, 48 are located at the junction where the precious metal-based electrode tips 32, 42 are built onto the nickel-based electrode bases 30, 40 with an additive manufacturing technique. At the interfused boundaries 38, 48, materials from the electrode bases 30, 40 and the electrode tips 32, 42 are somewhat fused together along an integrated additive manufactured or 3D printed junction, thereby further reducing stress at the inter-layer boundaries. This is different than a welded boundary, such as welded boundaries 50, 52, where a hard or discrete boundary is produced by welding the electrode base 30, 40 to an electrode body 36, 46. The present spark plug electrode is able to avoid a welded boundary between two substantially dissimilar materials (two "substantially dissimilar materials," as used herein, means two materials where one CTE is more than 25% greater than the other CTE). The interfused boundaries 38, 48 are produced by additive manufacturing and, therefore, are not "welded boundaries." The welded boundaries 50, 52 are between components 30/36 and 40/46, which are not "substantially dissimilar materials," as defined above, since they are nickel-based materials with CTEs that are within 25% of each other). Thus, neither of the electrode tip assemblies 34, 44 include a welded boundary between substantially dissimilar materials.

Turning now to FIGS. 4-5, there is shown another example of a spark plug 110, which is an industrial plug and includes the spark plug electrode of the present application. It should be appreciated that spark plug 110 has a number of similar features to the embodiment described in conjunction with FIGS. 1-3 and that the previous description of such features is applicable here as well, unless stated otherwise. Spark plug 110 includes a center electrode 112, an insulator 114, a metallic shell 116, a ground electrode 118, and an extension or sleeve 128. The center electrode 112 is disposed within an axial bore of the insulator 114 and includes a firing end 120 that protrudes beyond a free end 122 of the insulator 114. The firing end 120 may include an electrode base 130 made from a nickel-based material and an electrode tip 132 made from a precious metal-based material, where the electrode tip 132 is formed on the electrode base 130 using an additive manufacturing process (together, the electrode base 130 and the electrode tip 132 are referred to as an electrode tip assembly 134). The electrode tip assembly 134 is then welded to an electrode body 136, such as by resistance welding the electrode base 130 to the electrode body 136 (the electrode base 130, the electrode tip 132, and the electrode body 136, as well as other potential components, collectively make up the spark plug electrode, in this case the center electrode 112). Insulator 114 is disposed within an axial bore of the metallic shell 116 and is constructed from a material, such as a ceramic material. The free end 122 of the insulator 114 may be retracted within the metallic shell 116, as shown, or it may protrude beyond a free end 124 of the metallic shell 116. The extension 128 is preferably in the shape of a slotted sleeve or tube that extends from the shell free end 124 so that it shields the spark gap G from a stream of incoming air/fuel mixture. In a different embodiment, the extension 128 could be replaced with a prechamber cap that encloses the area around the firing end 120 in a prechamber, as is known in the art. Ground electrode 118 may include a precious metal-based sparking piece 154 that faces and forms a spark gap G with the electrode tip 132, however, this is optional as its possible for the ground electrode 118 to include a multi-piece electrode tip assembly (e.g., assembly 134), a single-piece sparking surface (like that shown), a different electrode tip or no electrode tip at all, to cite a few possibilities.

With reference to FIG. 6, another example of an electrode tip assembly 134 is shown that resembles the electrode tip assembly of FIG. 3, except this example has several grooves or channels 156 formed on its sparking surface 158. In this example, the electrode tip assembly 134 is shown having a square shape, however, it is possible for assembly 134 to have a circular, oval, rectangular, annular or other shape instead. The electrode tip assembly 134 may include an electrode base 130 with an electrode tip 132 that has been built on the electrode base via an additive manufacturing process, such as a powder bed fusion technique. After production of the electrode tip assembly 134 via the additive manufacturing process, the electrode tip assembly may then be attached, such as by resistance welding, to the corresponding electrode body 136. The welding features extending from the underside of the electrode base 130 can assist with resistance welding, however, they are optional and could be omitted in favor of a flat or planar surface. The multi-layer structure of the electrode tip assembly 134 helps reduce thermal stresses at inter-material boundaries or junctions, as previously explained. Building or forming the electrode tip 132 on the electrode base 130 through the use of an additive manufacturing process, results in an interfused boundary 138 that is located at the junction between the precious metal-based electrode tip 132 and the nickel-based electrode base 130. As with the previous embodiment, spark plug electrode 112 is able to avoid a welded boundary between two substantially dissimilar materials. The welded boundary 150 is between components 130/136, which are not "substantially dissimilar materials," as defined above, and the interfused boundary 138 does not include a weld. Thus, electrode tip assembly 134 does not include a welded boundary between substantially dissimilar materials.

Although the embodiments in FIGS. 1-6 have been provided to illustrate different examples of how the electrode tip assembly of the present application may be implemented in practice, it should be appreciated that these are just examples as the electrode tip assembly may be used with any number of spark plugs and other ignition devices. Some non-limiting examples include prechamber plugs, non-prechamber plugs (like that shown in FIGS. 1-3), shielded plugs (like that of FIGS. 4-6), plugs with an axial spark gap (like that of FIGS. 1-3), plugs with a radial spark gap (like that of FIGS. 4-6), plugs with a single ground electrode, plugs with multiple ground electrodes, plugs where all of the center and ground electrodes have precious metal-based tips, plugs where only some of the center and ground electrodes have precious metal-based tips, automotive plugs, industrial plugs, aviation plugs, etc. It should be appreciated that the following descriptions could apply to any such embodiments and are not limited to the exemplary embodiments specifically shown herein.

Electrode base 30, 40, 130 is the section or portion of the electrode tip assembly on which the electrode tip 32, 42, 132 is respectively formed by additive manufacturing and, thus, acts as a carrier material for the electrode tip. According to the embodiments in FIGS. 7-10, the electrode base 30, 40, 130 includes an electrode base body 170, a welding side 172 with one or more optional welding features 174, an additive manufacturing side 176, a pair of manufactured sides 178, and a pair of processed sides 180. The electrode base body may include a nickel-based material. The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base body 170 is made from a nickel-based material having a relatively high weight percentage of nickel, such as a nickel-based material comprising 98 wt % or more nickel. In a different example, the electrode base body is made from a nickel-based material having a lower weight percentage of nickel, like a nickel-based material comprising 50-90 wt % nickel (e.g., INCONEL™ 600 or 601). One particularly suitable nickel-based material has about 70-74 wt % nickel, 14-17 wt % chromium, 6-10 wt % iron, 0-2 wt % manganese, 0-1 wt % silicon, 0-0.5 wt % carbon, 0-0.05 wt % sulfur and/or other potential constituents such as copper. For nickel-based materials, the electrode base 30, 40, 130 may have a coefficient of thermal expansion between $12\times10^{-6}$ m/mK and $15\times10^{-6}$ m/mK (e.g., $13.4\times10^{-6}$ m/mK at 20° C.-200° C.), and a melting temperature between 1,200° C. and 1,600° C. (e.g., 1,400° C.).

The size and shape of the electrode base 30, 40, 130 can vary substantially depending on the particular application and embodiment. For example, if the electrode base is circular or oval in shape, the electrode base may have a diameter of between 0.5 mm-6.0 mm, inclusive (more preferably between 1.0 mm-4.0 mm, inclusive, and even more preferably between 1.2 mm-3.8 mm, inclusive); if the electrode base is square or rectangular in shape (as illustrated), then the electrode base may have length and width dimensions that are between 0.5 mm-6.0 mm, inclusive (e.g., 0.5 mm×0.5 mm, 1 mm×1 mm, 2 mm×2 mm, 2 mm×4 mm, 4 mm×4 mm, 6 mm×6 mm, etc.); and if the electrode base is a different shape, then other dimensions may be appropriate. Skilled artisans will appreciate that nickel-based materials are substantially less expensive than precious metal-based materials, thus, it is preferable that the electrode base 30, 40, 130 have a thickness that is greater than that of the corresponding electrode tip 32, 42, 132, as this can be useful during the process of welding the electrode tip assembly to the corresponding electrode body. In a non-limiting example, the electrode base 30, 40, 130 has an overall thickness (i.e., a thickness at the thickest part of the component) that is between 0.2 mm-2.0 mm, inclusive, and is at least 25% thicker than an overall thickness of the corresponding electrode tip (even more preferably, the overall thickness is between 0.2 mm-1.0 mm, inclusive, and is at least 35% thicker than an overall thickness of the corresponding electrode tip).

Figure 7:
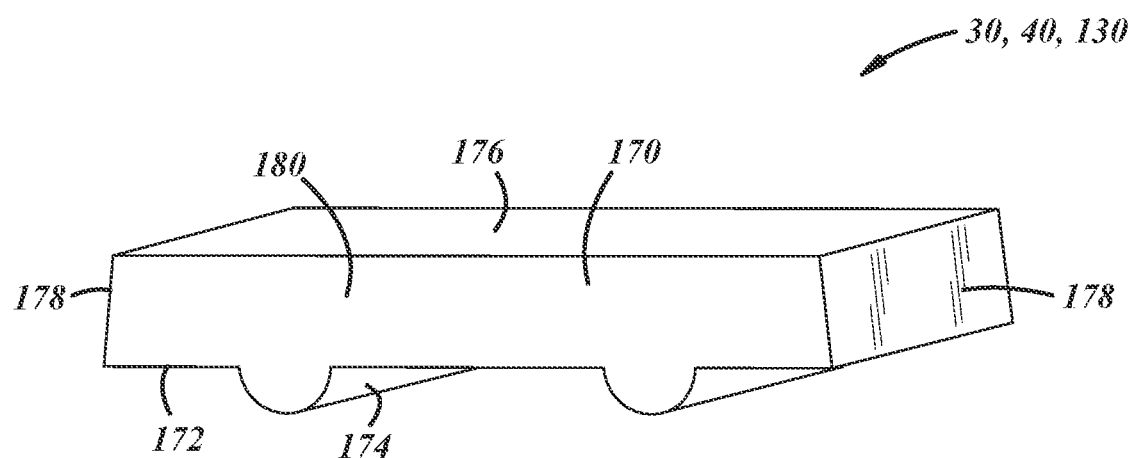
FIG. 7 is a perspective view of an electrode base according to an embodiment of the present disclosure, where welding features in the form of ribs extend from a welding side.
Figure 8:
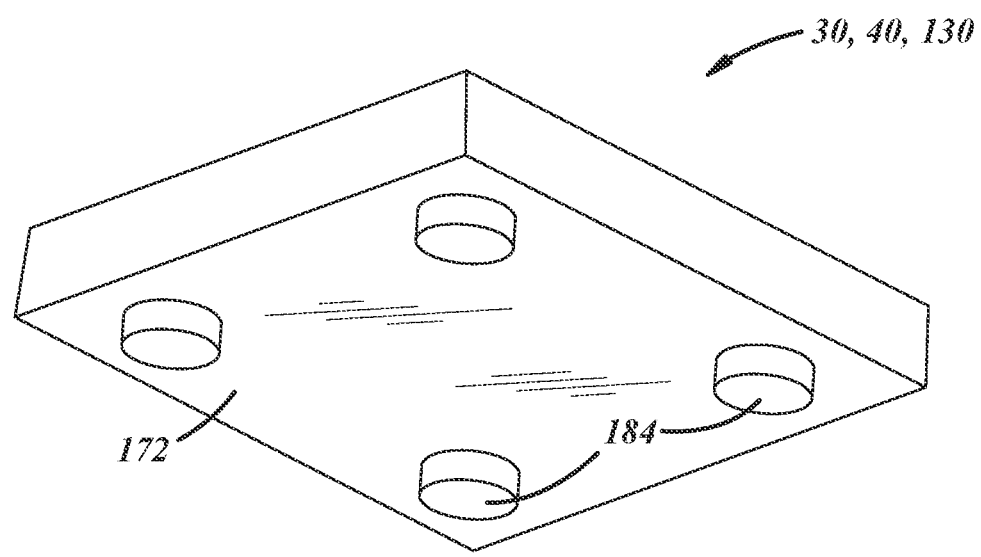
FIG. 8 is a perspective view of an electrode base according to another embodiment of the present disclosure, where welding features in the form of posts extend from a welding side.

Welding side 172 is the side of the electrode base that is configured to contact and be welded to an electrode body, such as the center electrode body 36 or the ground electrode body 46. To help facilitate such welding, particularly in the case of resistance welding, the welding side 172 may include one or more welding features 174 that help channel or focus electrical current used in the welding process. In the embodiment of FIG. 7, the welding features 174 are provided in the shape of a pair of elongated ribs or protrusions, where each elongated protrusion has a semi-circular cross-sectional configuration and extends across an entire width of the welding side 172 so that it is parallel to the other elongated protrusion. Of course, the present electrode tip assembly is not so limited and may include a different number of welding features, different shaped welding features, and different size welding features, to cite a few possibilities. For example, a different embodiment of a welding feature 184 is shown in FIG. 8 and is in the form of short cylindrical protrusions or posts extending from the welding side 172 of the electrode base. In this example, there are four cylindrical protrusions 184 located near the four corners of the welding side 172, however, a different number of protrusions, different size and shape protrusions, and a different arrangement or pattern of protrusions could be used instead. Other examples may have no welding features at all such that the underside or welding side 172 is substantially flat or planar. Although the illustrated examples show the welding side 172 being the underside of the electrode base, it is possible for the welding side to be a side surface of the electrode base, assuming the side surface is configured to contact and be welded to the electrode body (e.g., where an electrode tip assembly is inserted into a recess or a bore in the electrode body, and a circumferential weld around a side surface is used for attachment).

Additive manufacturing side 176 is the side of the electrode base that is configured to receive the electrode tip and, more specifically, is configured to provide a surface upon which the electrode tip may be built up, layer by layer, according to a suitable additive manufacturing process, like powder bed fusion. The additive manufacturing side 176 is generally parallel to and opposite from the welding side 172 and may be flat or planar in order to better accommodate an additive manufacturing process. Surface features, such as micro-etchings, grooves, channels, stipples, etc. may be added to the additive manufacturing side 176 in order to promote the bounding or connection between the electrode base and the electrode tip.

Figure 9:
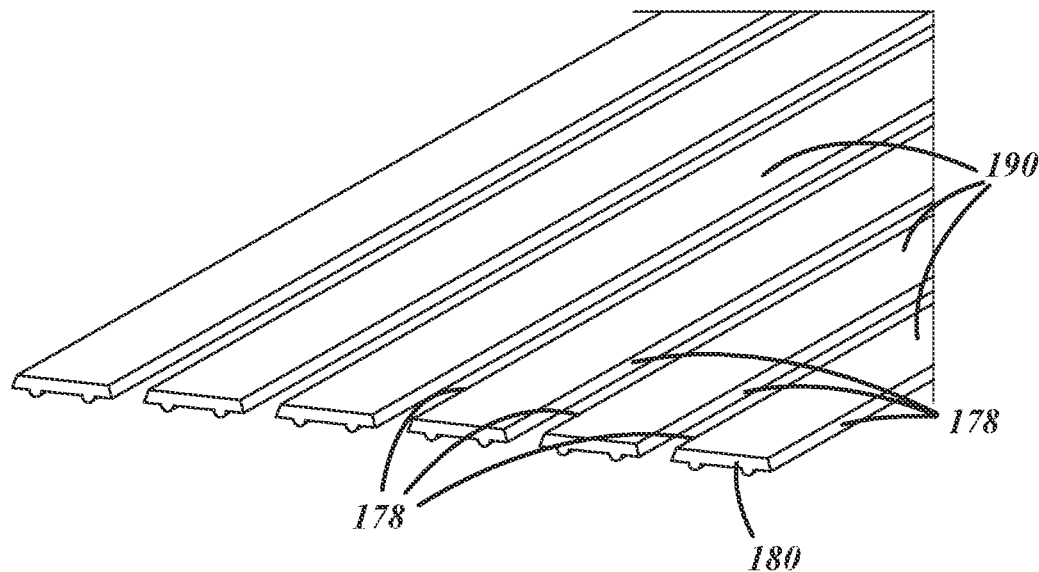
FIG. 9 is a perspective view of electrode bases in the form of elongated strips.

Manufactured sides 178 are sides of the electrode base that are opposite one another and extend between the welding side 172 and the additive manufacturing side 176 so that they generally correspond with the thickness of the electrode base. As best illustrated in FIG. 9, the electrode base 30, 40, 130 may be formed from elongated pieces or strips 190 of the nickel-based material described above. In such an embodiment, the strips 190 may be extruded, drawn, or otherwise manufactured from a nickel-based material so that a pair of relatively uniform manufactured sides 178 extending the length of the strips 190 are formed when the strips are manufactured. It is possible for the manufactured sides 178 to be slightly angled or tilted (e.g., 0-10°, inclusive), as opposed to being perfectly perpendicular to the welding side 172 and/or the additive manufacturing side 172 (e.g., see FIG. 7, where process side 180 is in the shape of a trapezoid due to angled manufacturing sides 178 that lean slightly inward at their top). Such a configuration, which is optional, may help ensure that the electrode tip 32, 42, 132 is not dimensionally larger than the electrode base 30, 40, 130 upon which it is built. Producing manufactured sides 178 with certain configurations and arrangements, such as tilted sides 178 or other features, can be easily and economically carried out with an extrusion or drawing process. The same is true for other elongated structures, like welding features 174.

Figure 10:
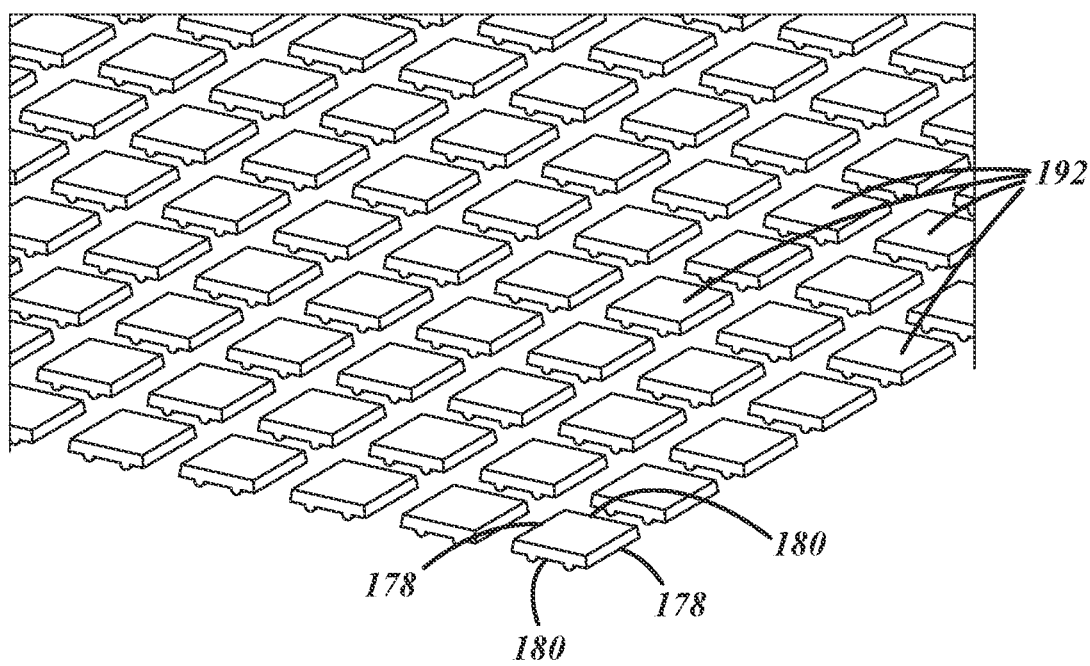
FIG. 10 is a perspective view of electrode bases in the form of discrete pieces.
Figure 11:
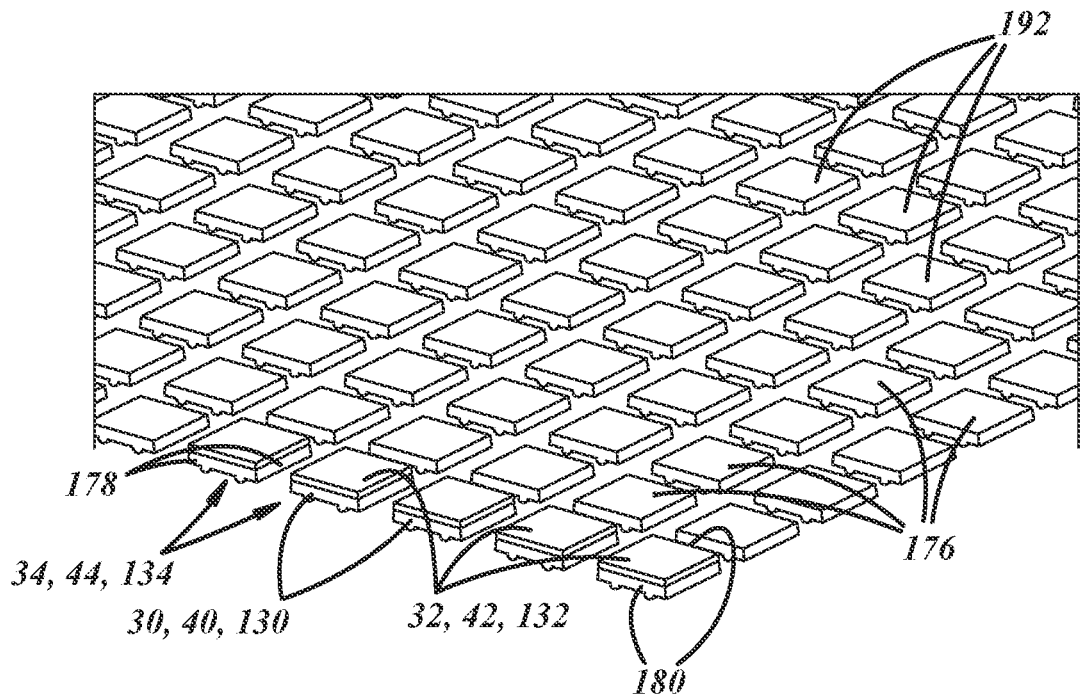
FIG. 11 is a perspective view of electrode tip assemblies, where electrode tips are built onto electrode bases that are in the form of discrete pieces via an additive manufacturing process.
Figure 12:
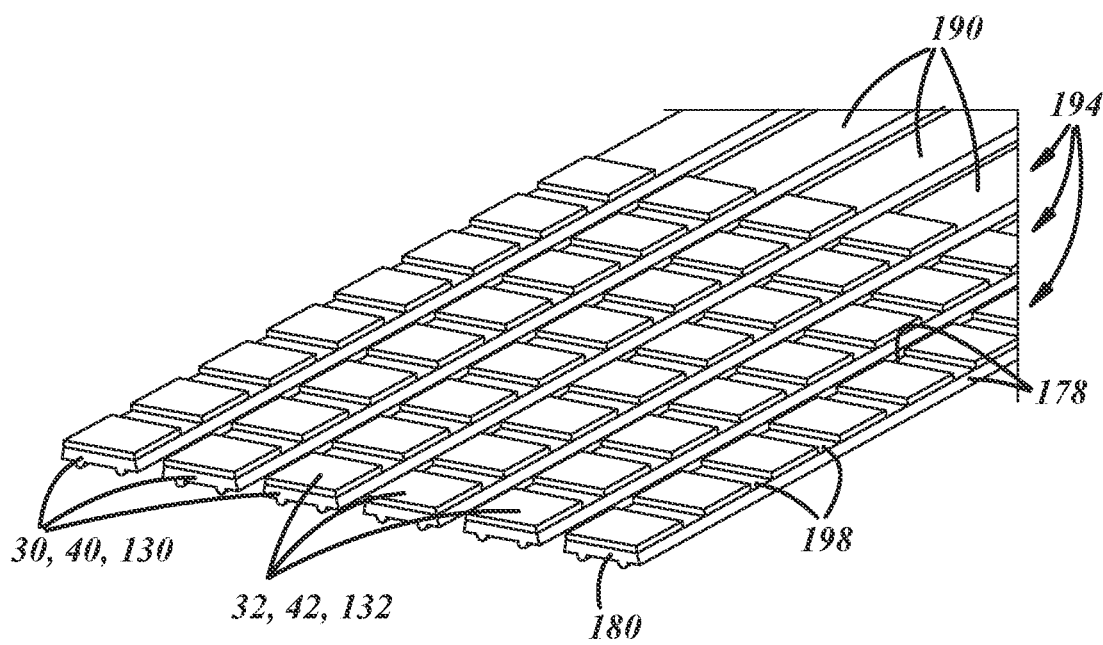
FIG. 12 is a perspective view of electrode tip assemblies, where electrode tips are built onto electrode bases that are in the form of elongated strips via an additive manufacturing process.

Processed sides 180 are sides of the electrode base that are also opposite one another and extend between the welding side 172 and the additive manufacturing side 176 so that they generally correspond with the thickness of the electrode base. However, the processed sides 180 are formed by cutting (e.g., mechanical, laser and/or other cutting), severing and/or otherwise separating the elongated strips 190 into individual discrete pieces 192 of a predetermined length such that processed or cut sides 180 are formed, as shown in FIG. 10. The processed sides 180 with their cut or severed surfaces may have more burrs, rough edges and/or other imperfections than the manufactured sides, or they may have different grain patterns. In a first example, the elongated strips 190 are cut into separate pieces 192 before the electrode tips are built onto the electrode bases by additive manufacturing (FIG. 11). In a second example, the electrode tips are built onto the electrode bases while they are still long strips 190 by additive manufacturing and then the individual pieces are cut (FIG. 12). In yet another example (FIG. 13), the electrode bases may be provided in the form of a sheet or plate 196, as opposed to discrete pieces 192 or long strips 190, so that the electrode tips can be built onto the sheet via additive manufacturing either before or after the sheet is cut along rows and columns to form individual pieces. In the case of the elongated strips 190, once they have been extruded or drawn out, the nickel-based material typically has an elongated grain structure so that when it is cut or severed into individual pieces 192, an electrode base 30, 40, 130 is formed where the manufactured sides 178 generally extend in a parallel direction to the elongated grain structure, whereas the processed sides 180 generally extend in a perpendicular direction to the elongated grain structure. Furthermore, the electrode base 30, 40, 130 may include a generally homogeneous nickel-based composition that extends across a single material layer, as opposed to the electrode tip 32, 42, 132 which includes a number of layers sequentially built on top of each other, as will be explained.

Electrode tip 32, 42, 132 is the section or portion of the electrode tip assembly, including the sparking portion, that is respectively formed on the electrode base 30, 40, 130 by additive manufacturing. As such, the electrode tip 32, 42, 132 may be made from a bed of precious-metal based powder that is brought into close proximately with the electrode base so that, when irradiated by an energy source like a laser or electron beam, the precious metal-based powder and some of the solid material of the electrode base are melted and then solidify into an initial laser deposition layer 200 (see FIG. 2). This causes the electrode tip to be coated onto the electrode base. This process of creating individual layers is repeated, thereby creating a number of additional laser deposition layers 202-206 that are sequentially built or stacked on one another. Each laser deposition layer 200-206 has an average layer thickness Y, which may be between 10 μm and 150 μm (depending on the powder grain size, etc.), and the total or sum of all of the layer thicknesses is the electrode tip height X, which may be between 0.1 mm and 1.0 mm, or even more preferably between 0.1 mm and 0.4 mm. For purposes of illustration, the electrode tips are schematically shown in FIG. 2 as only having a few laser deposition layers 200-206 that are visibly distinct from one another, however, the actual number of such layers may be less or more than those shown and may or may not be visibly discernable; in some cases there could be substantially more layers that blend together so that they are not visibly discernible. According to a non-limiting example, the electrode tip 32, 42, 132 includes between 5-30 laser deposition layers, inclusive, and even more preferably between 10-20 laser deposition layers (depending on the powder grain size, the desired electrode tip height, etc.).

Electrode tip 32, 42, 132 may be made from a precious metal-based material so as to provide improved resistance to corrosion and/or erosion. The term "precious metal-based material," as used herein, means a material in which a precious metal is the single largest constituent of the material by weight, and it may or may not contain other constituents (e.g., a precious metal-based material can be pure precious metal, precious metal with some impurities, or a precious metal-based alloy). Precious metal-based materials that may be used include iridium-, platinum-, ruthenium- and/or palladium-based materials, to cite a few possibilities. According to one example, the electrode tip 32, 42, 132 is made from an iridium- or platinum-based material, where the material has been processed into a powder form. For iridium-based materials, the electrode tip may have a coefficient of thermal expansion between $6\times10^{-6}$ m/mK and $7\times10^{-6}$ m/mK and a melting temperature between 2,400° C. and 2,500° C.; for platinum-based materials, the electrode tip may have a coefficient of thermal expansion of between $8\times10^{-6}$ m/mK and $10\times10^{-6}$ m/mK and a melting temperature between 1,700° C. and 1,800° C. According to a non-limiting example, the electrode tip 32, 42, 132 is made from an iridium-based material, such as Ir—Rh, Ir—Pt, Ir—Pt—Rh alloys (e.g., Ir—Rh (1-10 wt %), Ir—Rh 10, Ir—Rh 5, Ir—Rh 2.5), although other precious metal-based materials may be used instead.

The size and shape of the electrode tip 32, 42, 132 can vary substantially depending on the particular application and embodiment, but they are typically designed to stack directly on top of and share a common footprint with the underlying electrode base 30, 40, 130. If the electrode tip is circular or oval in shape, the electrode tip may have a diameter of between 0.5 mm-6.0 mm, inclusive (more preferably between 1.0 mm-4.0 mm, inclusive, and even more preferably between 1.2 mm-3.8 mm, inclusive); if the electrode tip is square or rectangular in shape (as illustrated), then the electrode tip may have length and width dimensions that are between 0.5 mm-6.0 mm, inclusive (e.g., 0.5 mm×0.5 mm, 1 mm×1 mm, 2 mm×2 mm, 2 mm×4 mm, 4 mm×4 mm, 6 mm×6 mm, etc.); and if the electrode tip is a different shape, then other dimensions may be appropriate. Skilled artisans will appreciate that, due to the hardness of precious-metal based materials, it can be difficult and costly to cut through such materials. Thus, in cases where the electrode tip is first formed on long strips 190 (FIG. 12) or a plate 196 (FIG. 13) before the electrode base is cut into separate pieces, it may be desirable for the electrode tip 32, 42, 132 to have dimensions that are slightly smaller (e.g., 0.05 mm-0.2 mm smaller) than the underlying electrode base 30, 40, 130 so that a cutting tool can cut, sever and/or otherwise separate the electrode bases without having to cut through the substantially harder electrode tips. In such cases, the electrode base 30, 40, 130 may have a small lip or flange extending along at least the processed sides 180 where the electrode base is cut. The electrode tip 32, 42, 132 may include embodiments that: are dimensionally reduced with respect to an electrode base, as well as those that are not; are in the shape of rivets, cylinders, bars, columns, balls, mounds, cones, flat pads, disks, rings, tubes, sleeves, etc.; are located at an axial end of an electrode, as well as those that are located on and/or surround a side surface or other part of the electrode; are part of a center electrode or a ground electrode; are made from a precious metal-based material (e.g., materials that have iridium, platinum, palladium, ruthenium, etc.), as well as those that are made from another material; and have additional stress relieving or intermediate layer(s) between the electrode base and tip, as well as ones that do not, to cite but a few possibilities.

During manufacture, a method 300 may be used to form the electrode base, to build the electrode tip on the electrode base via an additive manufacturing process that creates an electrode tip assembly, and then to attach the electrode tip assembly to the center and/or ground electrode, as illustrated in FIGS. 9-15 and described below. Starting with step 302, one or more electrode base(s) 30, 40, 130 are formed or provided using any number of different techniques. In a first example (shown in FIG. 10), the electrode base(s) are formed as separate or discrete pieces 192 made from a nickel-based material. Such pieces may be initially formed separately or they may be formed as a group and then cut or severed into individual pieces 192. According to a second example (shown in FIG. 9), the electrode base(s) are formed as long strips 190 that may be extruded, drawn, or otherwise manufactured using a nickel-based material. In a third example (FIG. 13), the electrode base(s) are formed as a flat plate or sheet 196 that is made of a nickel-based material and is large enough to accommodate multiple rows and/or columns of electrode bases. Other methods and techniques are certainly possible for forming the electrode base(s) and are within the scope of the present application.

In step 304, one or more electrode tip(s) 32, 42, 132 are formed on one or more electrode base(s) 30, 40, 130 using an additive manufacturing process, such as a powder bed fusion process, so that one or more electrode tip assembly(ies) 34, 44, 134 are created. According to an example of such a process, one or more electrode base(s) 30, 40, 130 can be inserted into a jig or other build tool that maintains them in an orientation such that the additive manufacturing side(s) 176 face upwards and are generally aligned in a common plane (it may be helpful to use a quick grinding step on sides 176 to put them at the same level). A bed of powder that includes precious-metal based material can then be placed over the electrode base(s) such that a thin layer of precious-metal based powder covers the additive manufacturing side(s) 176 of the electrode base(s). Once the powder bed is in place, an energy source such as a laser or electron beam can be used to melt or at least sinter the thin powder layer that is over top of the electrode base(s), along with a certain amount of the electrode base(s) themselves; this is the powder bed fusion process. When the combination of the melted powder (precious metal-based material) and the electrode base(s) (nickel-based material) solidifies, it forms the initial laser deposition layer 200 (the creation of such layers may be done in a protective gas atmosphere). This process is then repeated a number of times to then form the subsequent laser deposition layers 202-206. It is possible for the additive manufacturing process to impart or create any number of different surface features on the electrode tip, such as the grooves or channels 156 shown in FIG. 6, which can help reduce a starting ignition voltage. Other features, patterns, arrangements, etc. are certainly possible as well.

The first several layers that are formed (e.g., laser deposition layers 200, 202, etc.) may include both electrode base material and electrode tip material and are designed to have a CTE value that is in between that of the electrode base 30, 40, 130 and electrode tip 32, 42, 132; layers 200, 202, etc. may constitute an intermediate layer or region 210. In the intermediate layer 210, a "whole area connection" may be formed during the additive manufacturing process that fuses and connects the electrode tip to the electrode base across the entire area of their junction or interface, as opposed to only connecting them together along the perimeter of their junction or interface, as is typically the case with laser welding. The whole area connection does not include a traditional weld joint and can create a stronger, more durable bond between these electrode components, which can be useful in view of their inter-layer CTE difference. The final laser deposition layer 206 that is formed may act as a sparking surface. In some examples, the intermediate layer or region 210 is comprised of 50% or more precious metal (i.e., of the total material, both nickel- and precious metal-based material, that makes up the intermediate layer or region 210, at least 50% is precious metal). At one point, the laser deposition layers may only include material from the powder bed (i.e., the precious metal-based material); these layers are referred to as the precious metal layers or region 212 and can be comprised of 95% or more precious metal. A non-limiting example of a possible electrode tip assembly 34, 44, 134 structure includes: an electrode base 30, 40, 130 made of a nickel-based material (e.g., Inconel 600), an intermediate layer or region 210 made of one or more iridium-based material(s) (e.g., Ir-10Ni, Ir-30Ni, Ir—Ni—Rh, Ir—Pt—Ni), and a precious metal layer or region 212 made of one or more precious metal-based material(s) (e.g., iridium-based materials like Ir—Rh 2.5 wt %). For purposes of simplicity, the electrode tip 32, 42, 132 is schematically shown in FIG. 2 having only a few laser deposition layers 200-206, however, in actual production, the electrode tip will likely have more layers than are shown. Furthermore, the average layer thicknesses Y and the electrode tip height X disclosed above are only meant to be examples, as the present electrode tip assembly is not limited to such ranges.

Figure 13:
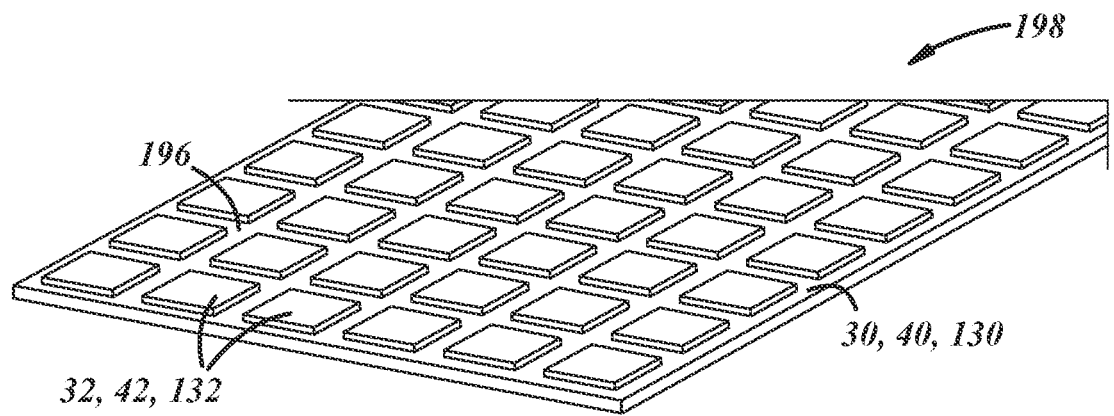
FIG. 13 is a perspective view of electrode tip assemblies, where electrode tips are built onto an electrode base that is in the form of a sheet via an additive manufacturing process.

FIGS. 11-13 show several different examples of how step 304 may be carried out. In FIG. 11, the additive manufacturing process in step 304 is used to build electrode tips 32, 42, 132 on the additive manufacturing surfaces 176 of the electrode bases 30, 40, 130 in the form of individual pieces 192 (i.e., a one-to-one electrode tip to electrode base manufacturing process) so that a number of electrode tip assemblies 34, 44, 134 are formed. Each resulting electrode tip assembly 34, 44, 134 has an electrode base with a pair of manufactured sides 178 and a pair of processed sides 180, and an electrode tip.

In FIG. 12, the additive manufacturing process in step 304 is used to build multiple electrode tips 32, 42, 132 on electrode bases 30, 40, 130 in the form of long strips 190 (i.e., a many-to-one electrode tip to electrode base manufacturing process) so that one or more electrode strip assembly(ies) 194 are formed. Each resulting electrode strip assembly 194 includes a single, common electrode base in the form of a long strip 190 with a pair of manufactured sides 178 and a pair of processed sides 180 (one processed side at each end of the strip where the strip has been cut or severed), and a number of electrode tips linearly arranged in a row. The electrode strip assembly 194 does not have processed sides 180 located between adjacent electrode tips since the long strip has not yet been cut into individual pieces. The electrode strip assembly 194 may be provided in straight, linear segments (as shown in FIG. 12), or it may be provided in the form of a coil or roll.

According to another example (FIG. 13), the additive manufacturing process in step 304 is used to build multiple electrode tips 32, 42, 132 on electrode bases 30, 40, 130 in the form of sheets or plates 196 so that one or more electrode sheet assembly(ies) 198 are formed. Each resulting electrode sheet assembly 198 includes a single, common electrode base in the form of a flat sheet 196 with a combination of manufactured sides and/or processed sides (depends on how the sheet was manufactured), and a number of electrode tips arranged in an array or matrix of rows and columns. The electrode sheet assembly 198 does not have manufactured sides or processed sides located between adjacent electrode tips since the sheet has not yet been cut into individual pieces. The electrode sheet assembly 198 may be provided as planar sheets or plates (as shown in FIG. 13) or in some other form.

Figure 14:
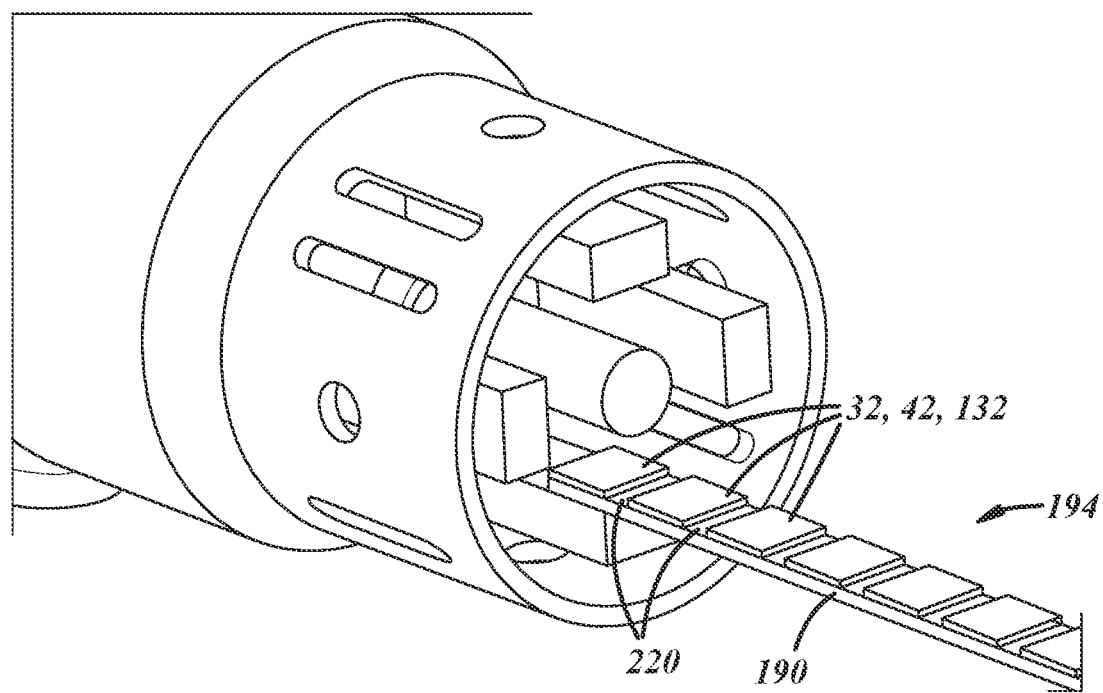
FIG. 14 is a perspective view of a spark plug, where an electrode tip assembly, such as those shown in FIG. 12, is being attached to an electrode body.
Figure 15:
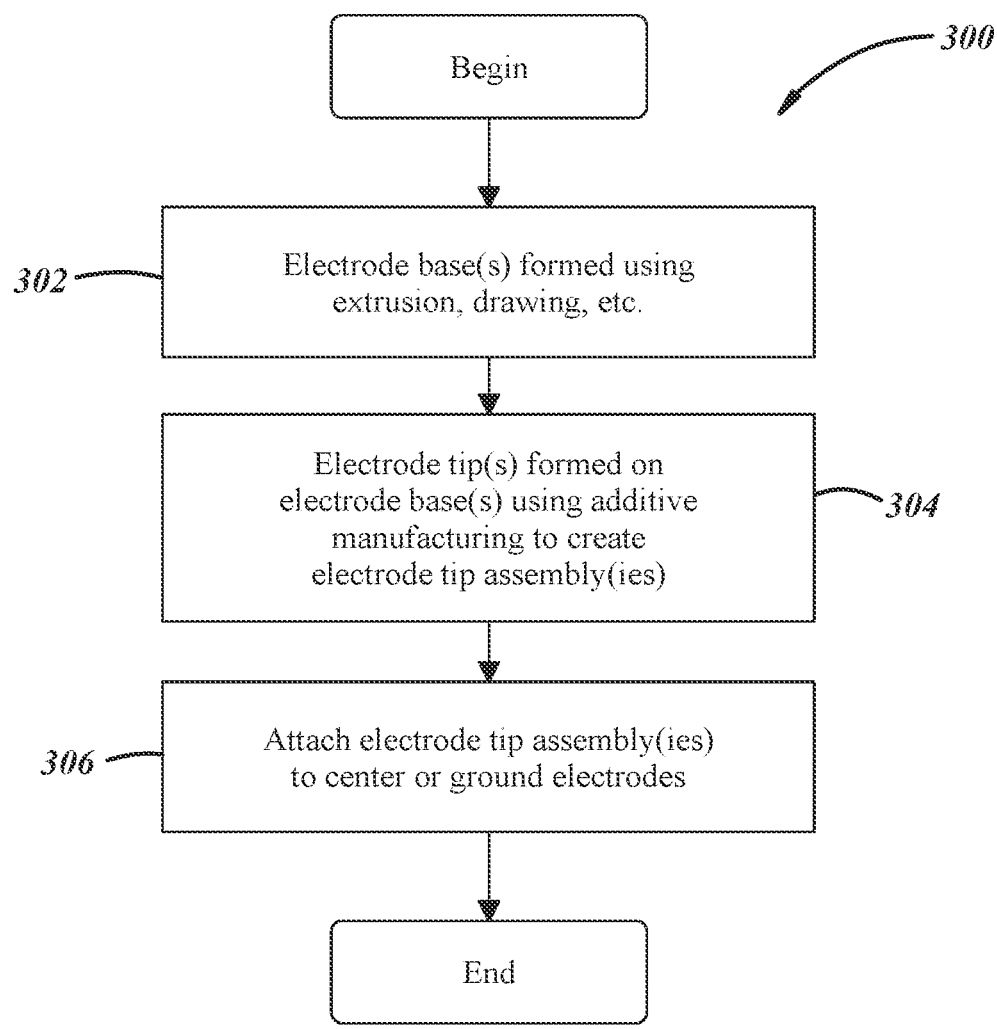
FIG. 15 is a flowchart of a method of assembling a spark plug electrode tip according to an embodiment of the present disclosure.

Next, step 306 attaches one or more electrode tip assembly(ies) to one or more center and/or ground electrode(s). Step 306 may attach each electrode tip assembly 34, 44, 134 onto a center or ground electrode body 36, 46 through resistance welding. When both the electrode base 30, 40, 130 and the underlying electrode body 36, 46 are made from a nickel-based material, as is preferable, resistance welding can be carried out in an easy and economical manner, as it obviates the need for expensive laser welding and other equipment. In the case where the previous step produced electrode tip assemblies 34, 44, 134 as individual pieces (FIG. 11), step 306 may simply weld such pieces, one at a time, onto the center or ground electrode body. In the case where the prior step created electrode strip assemblies 194 in the form of long strips (FIG. 12), step 306 may align each electrode strip assembly on the desired portion of the center or ground electrode, weld the desired portion of the electrode strip assembly on the electrode body, and then cut or sever the remaining portion of the electrode strip assembly, as illustrated in FIG. 14. It may be desirable to only cut through the nickel-based material of the electrode base, as opposed to cutting through the harder precious metal-based material of the electrode tip, such as by cutting through the small lip or flange 220 in between the electrode tips. This technique may be advantageous in terms of simplifying the welding process, as handling an entire electrode strip assembly can be easier than handling small, individual pieces. In the case where the prior step created electrode sheet assemblies 198 in the form of sheets or plates (FIG. 13), step 306 may first cut the sheet into long strips and then perform the welding process illustrated in FIG. 14, or step 306 may align each electrode sheet assembly on the desired portion of the center or ground electrode, weld the desired portion of the electrode sheet assembly on the electrode body, and then cut or sever the remaining portion of the electrode sheet assembly away. This technique may be difficult in applications where there is not much clearance or room near the center or ground electrode to manipulate and align the electrode sheet assembly, in which case it may be preferable to cut the sheet into long strips before welding. Skilled artisans will appreciate that is possible to manufacture the electrode tip, strip and/or sheet assemblies at one location and easily ship them to another location for attachment.

Following step 306, any number of post attachment steps may be carried out, depending on the particular application.

Figure 16:
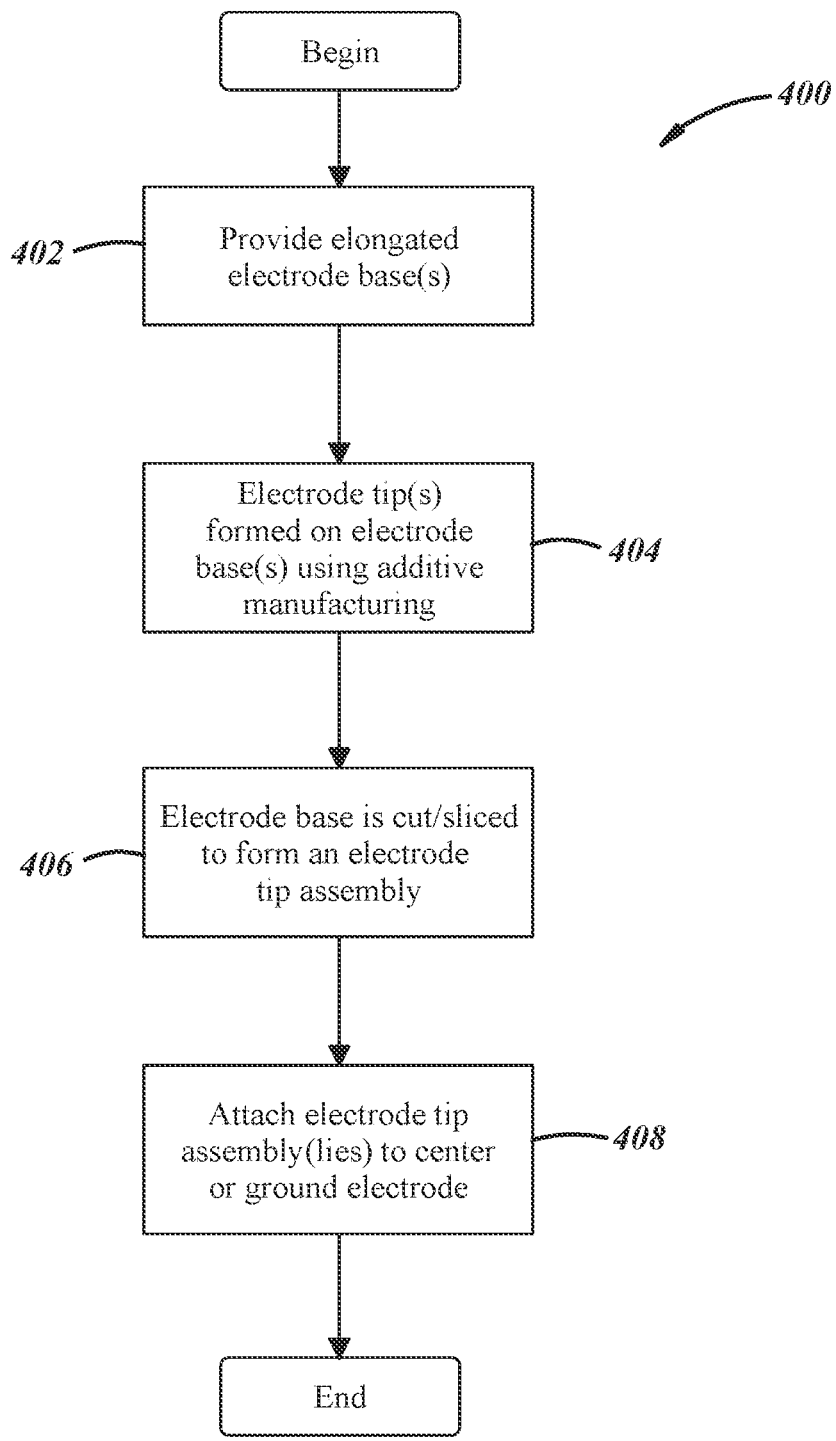
FIG. 16 is a flowchart of another method of assembling a spark plug electrode tip according to an embodiment of the present disclosure.
Figure 17:
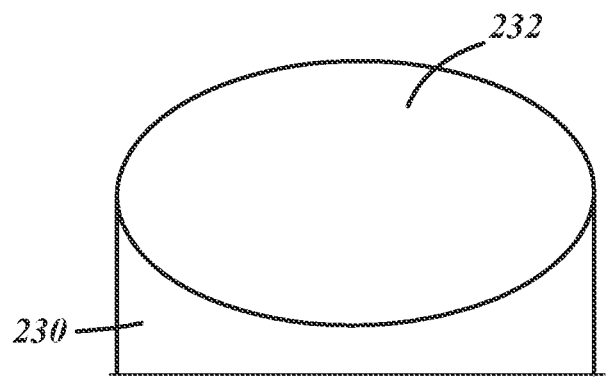
FIGS. 17-20 are perspective views of different stages of an electrode tip assembly being formed according to the method in FIG. 16.
Figure 18:
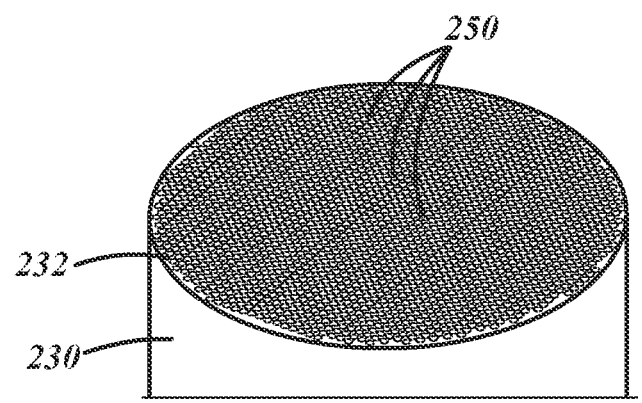
Figure 21:
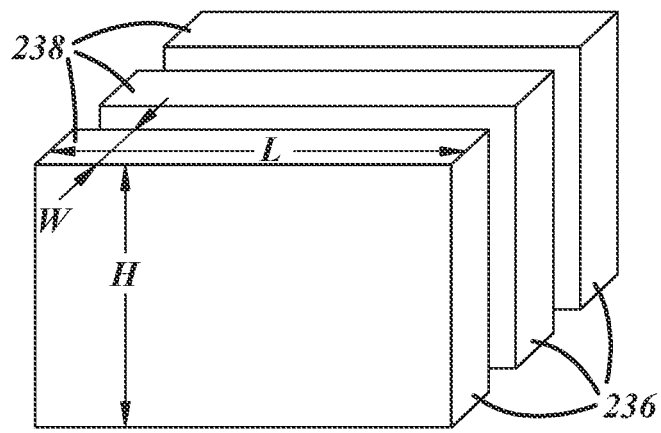
FIGS. 21-24 are perspective views of different stages of another electrode tip assembly being formed according to the method in FIG. 16.
Figure 22:
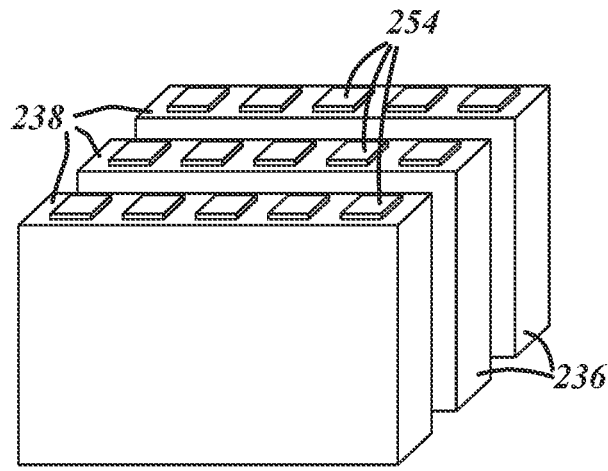
Figure 23:
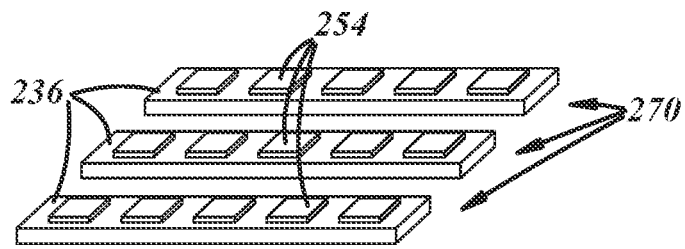
Figure 24:
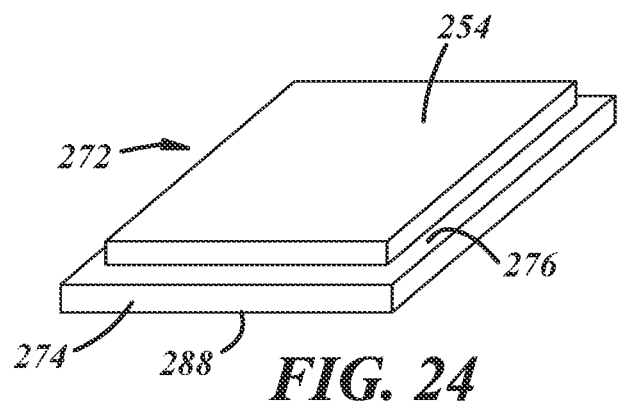
Figure 25:
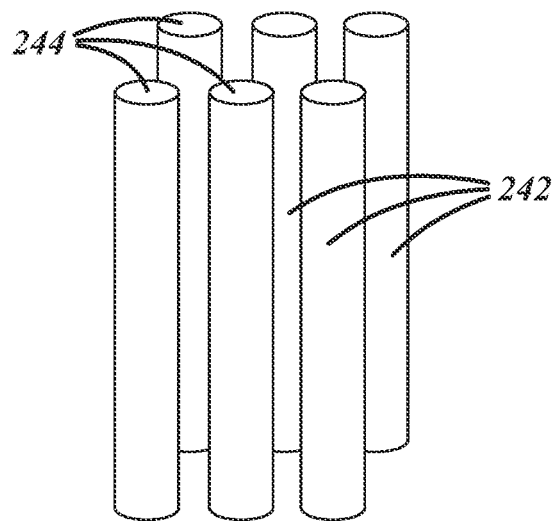
FIGS. 25-27 are perspective views of different stages of yet another electrode tip assembly being formed according to the method in FIG. 16.
Figure 26:
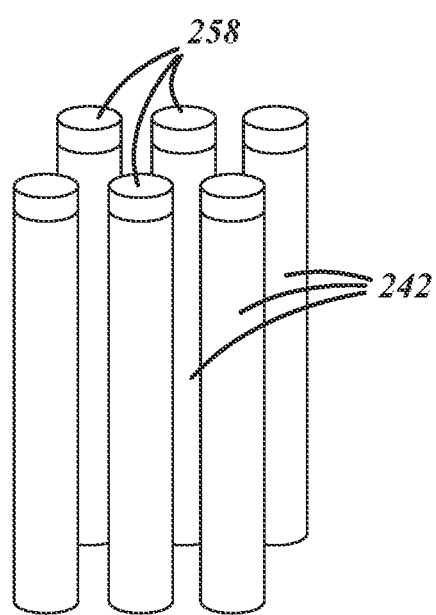

Turning now to FIG. 16, there is shown another method 400 that may be used to form an electrode base, to build an electrode tip on the electrode base via additive manufacturing, and then to attach the electrode tip assembly to the center and/or ground electrode. In step 402, one or more electrode base(s) are provided with one of a number of possible configurations. For instance, an electrode base could be provided in the form of one or more large, elongated cylinder(s) or bar(s) 230 made from a nickel-based material (e.g., one having a circular, oval, square, rectangular or other cross-section), as illustrated in FIGS. 17-18. In this instance, the large, elongated bar 230 has a rather long length (e.g., 100 mm-200 mm axial length) and a diameter that is many times larger than that of the corresponding electrode tips that will be built upon it (e.g., elongated bar 230 may have a diameter from 80 mm-160 mm, whereas the corresponding electrode tip may have a diameter from 0.5 mm-6.0 mm, inclusive). This configuration allows numerous electrode tips to be built upon a single electrode base (i.e., a many-to-one electrode tip to electrode base manufacturing process). In a different example, step 402 may provide an electrode base in the form of one or more large, elongated plate(s) or slab(s) 236 that are made from a nickel-based material, as shown in FIGS. 21-22. Each of the large, elongated plates or slabs 236 may have an additive manufacturing side 238 that, in at least one dimension, is many times larger than the corresponding electrode tips that will be formed on it. In FIGS. 21-22, there is shown an example where each of the additive manufacturing sides 238 is in the shape of a rectangular strip, similar to strips 190, where a width W is approximately the same size as that of an electrode tip, a length L is many times larger than that of an electrode tip, and a height H is many times larger than that of an electrode tip. This configuration also allows numerous electrode tips to be built upon a single electrode base (i.e., a many-to-one electrode tip to electrode base manufacturing process). In yet another example, which is shown in FIGS. 25-26, step 402 provides an electrode base in the form of a number of small, elongated rods or bars 242 that are made from a nickel-based material. The bars 242 are shown with a circular cross-sectional shape, but this is only one possibility, as they could have an oval, square, rectangular or other cross-sectional shape instead. In this example, each of the small, elongated bars 242 has an additive manufacturing side 244 that is approximately the same size as the electrode tips that will be built upon it. This configuration allows a single electrode tip to be built upon a single electrode base (i.e., a one-to-one electrode tip to electrode base manufacturing process). In each of the examples above, the exact size, shape and/or number of electrode bases may vary, however, each electrode base is initially provided in a form that has an elongated axial length that can be subsequently sliced or cut to length, which is different than the previous embodiments where the electrode bases were provided in the form of thin strips or sheets.

Next, one or more electrode tip(s) are formed on one or more electrode base(s) using an additive manufacturing process, such as a powder bed fusion process, step 404. A duplicative description of an additive manufacturing process has been omitted for purposes of simplicity, however, it should be recognized that any of the additive manufacturing processes, steps, features, aspects, etc. described above are applicable to step 404 as well. According to the example shown in FIGS. 17-20, a large number of electrode tips 250 made from a precious metal-based material may be formed on the additive manufacturing side 232 of the large, elongated bar 230. Skilled artisans will appreciate that computer-generated patterns designed to optimize the surface area of additive manufacturing side 232 may be employed in order to form as many electrode tips as possible (e.g., dozens, hundreds or even thousands of electrode tips, each with a diameter from 0.5 mm-6.0 mm, inclusive, and a height of about 0.1 mm-0.5 mm, could be formed on a single electrode base). In the example of FIGS. 21-24, a number of precious metal-based electrode tips 254 may be formed or built on the additive manufacturing side 238 of the different elongated plate(s) or slab(s) 236. In the illustrated example, the elongated plates 236 have a small width W that only accommodates a single row of electrode tips 254, however, plates with a larger width W may be used such that two, three or even more rows of electrode tips can be formed side by side. The example of FIGS. 25-27, on the other hand, has one electrode tip 258 built or formed by additive manufacturing on the additive manufacturing side 244 of each elongated bar 242. The electrode tip 258 may be the same size as the underlying electrode base or it may be slightly smaller than the electrode base to reveal a small lip or edge extending around at least a part of the electrode tip perimeter. It should be appreciated that in all three of the preceding examples—whether the electrode base be provided in the form of a large, elongated bar 230 or an elongated plate 236 or a small, elongated bar 242—the electrode base is positioned in an additive manufacturing jig or build tool such that it is upright or vertical with its additive manufacturing side facing upwards so that it can be covered by a thin bed of precious metal-based powder. Skilled artisans will understand that in order to position or orient the electrode bases for additive manufacturing, the jig or build tool needs one or more complementary shaped recesses or cavities that are sized and shaped to maintain the electrode bases in their proper orientation (e.g., a large cylindrical cavity to receive and orient large elongated bar 230 in an upright position, several rectangular parallelopiped cavities arranged side by side to accommodate and maintain the several elongated plates 236 in an upright position, and a number of thin cylindrical cavities or bores into which the small elongated bars 242 can be inserted such that their upper axial ends or additive manufacturing sides are exposed). If multiple electrode bases are arranged in the build tool, such as in FIGS. 21-24 and FIGS. 25-27, then it is preferable that all of the additive manufacturing sides be aligned in a common plane. Step 404 builds one or more electrode tip(s), layer by layer, on each electrode base.

Figure 19:
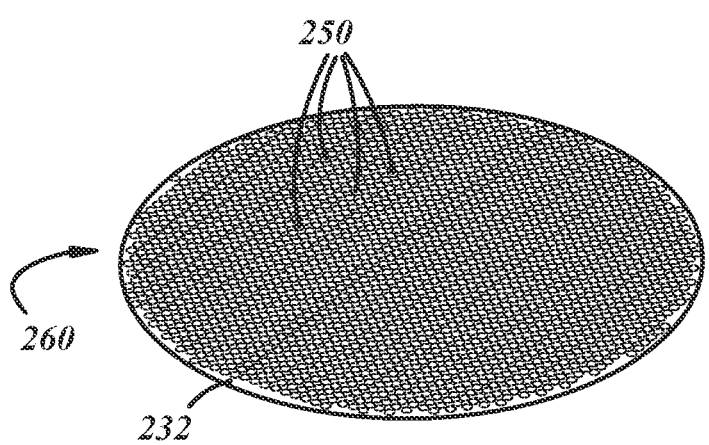
Figure 20:
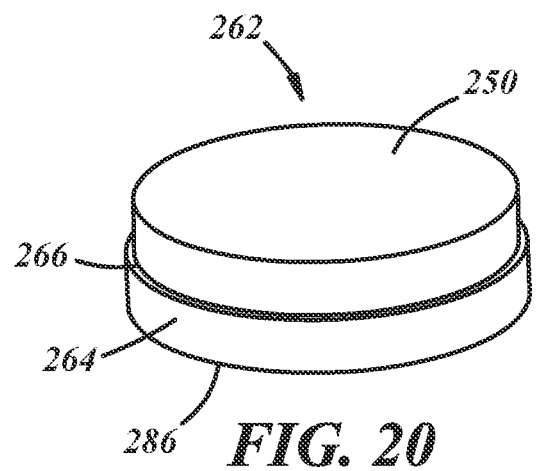
Figure 27:
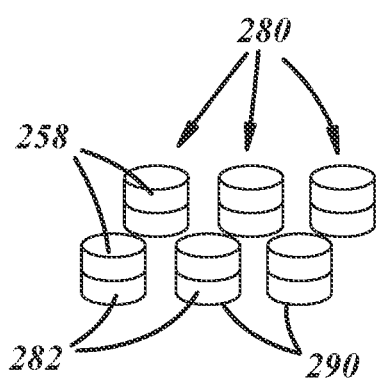

In step 406, each electrode base is cut and/or sliced to form one or more electrode tip assemblies. The nature of the cutting or slicing operation depends on the nature of the electrode base. For instance, in FIGS. 17-20, where a large number of electrode tips 250 are formed on a large, elongated bar 230, step 406 must slice the electrode base at a certain axial height (e.g., between 0.1 mm-0.5 mm) such that an electrode slice assembly 260 is created, as shown in FIG. 19. Then, step 406 can cut around the perimeter of each electrode tip 250 such that a number of separate electrode tip assemblies 262 are created, as seen in FIG. 20. When the electrode base 264 is slightly larger than the electrode tip 250, a small lip or flange 266 may be formed around at least part of the perimeter of the electrode tip. If the elongated bar 230 is quite large (e.g., a diameter greater than 100 mm), it may be difficult to cut a cross-sectional slice through the entire bar and maintain a relatively uniform thickness. To overcome this, the example in FIGS. 21-24 use one or more elongated plates 236 that are smaller in cross-section than the elongated bar 230 (thus, the cutting process is somewhat easier and a uniform thickness can be easier to achieve). After slicing each of the elongated plates 236 into electrode strip assemblies 270, the process may cut around each electrode tip 254 so that a number of individual electrode tip assemblies 272 are created with a small lip or flange 276 at least partially surrounding the electrode tip 254 (e.g., the flange can extend around all four sides, three sides, two sides, one side, etc.), see FIG. 24. For the example shown in FIGS. 25-27, which has a number of smaller elongated bars 242, step 406 only needs to use a slicing operation to cut the electrode bars 242 to length; it does not need a separate cutting operation to cut around the perimeter of each electrode tip, since the electrode bases 282 already have their intended perimeter shape. Slicing the various electrode bars 242 creates a number of electrode tip assemblies 280, as shown in FIG. 27. In each of the preceding examples, the slicing and/or cutting operations may be carried out using waterjet, laser, electrical discharge machining (EDM) and/or some other suitable technology. The remaining section of the elongated bar 230, the elongated plates 236 and/or the elongated bars 242 could then be used in subsequent cycles to create new electrode tip assemblies. It is also possible for the slicing and cutting operations to be reversed so that the different perimeters of the electrode tips were cut first to a certain depth, and then the electrode base is sliced. Other embodiments are certainly possible as well.

It should be noted that following step 406, each of the electrode tip assemblies 262, 272, 280 includes an electrode base 264, 274, 282 with a welding side (i.e., the underside) 286, 288, 290, respectively, that has cut or sliced surfaces. The cut or sliced surfaces on the welding side may generally be perpendicular to the elongated grain structure of the part and are different than surfaces on a manufactured side. Put differently, the elongated bar 230, the elongated plates 236 and the elongated bars 242 have grain structures that typically extend in an axial direction or the direction of elongation of the part, and the cut or sliced surfaces of the welding sides 286, 288, 290 are generally perpendicular to such grain structures.

Referring back to the method in FIG. 16, step 408 attaches an electrode tip assembly to a center electrode, a ground electrode or both. Any of the previously described methods and techniques for such attachment may be used here. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An electrode tip assembly for a spark plug, comprising:
an electrode base that includes a welding side and an additive manufacturing side; and
an electrode tip that is formed on the electrode base, wherein the electrode tip includes a plurality of laser deposition layers and is built on the additive manufacturing side of the electrode base.

2. The electrode tip assembly of claim 1, wherein the electrode base includes a nickel-based material and the electrode tip includes a precious metal-based material.

3. The electrode tip assembly of claim 2, wherein the precious metal-based material is an iridium-based material.

4. The electrode tip assembly of claim 1, wherein the electrode base further includes manufactured sides and processed sides, the welding side is configured to be welded to an electrode body, the additive manufacturing side is configured to provide a surface upon which the electrode tip is built up, the manufactured sides extend between the welding side and the additive manufacturing side and correspond with a thickness of the electrode base, and the processed sides also extend between the welding side and the additive manufacturing side and correspond with a thickness of the electrode base.

5. The electrode tip assembly of claim 4, wherein the manufactured sides include extruded or drawn surfaces and the processed sides include cut or severed surfaces.

6. The electrode tip assembly of claim 4, wherein the processed sides are perpendicular to at least one of the welding side and/or the additive manufacturing side, and the manufactured sides are slightly angled with respect to at least one of the welding side and/or the additive manufacturing side and lean inwards such that a width dimension of the additive manufacturing side is slightly smaller than a width dimension of the welding side.

7. The electrode tip assembly of claim 1, wherein the welding side of the electrode base includes one or more welding feature(s) that extend or protrude from the welding side and are configured to assist with welding.

8. The electrode tip assembly of claim 7, wherein the welding feature(s) include a plurality of short cylindrical posts that extend from the welding side.

9. The electrode tip assembly of claim 1, wherein the welding side of the electrode base includes one or more cut or sliced surfaces.

10. The electrode tip assembly of claim 1, wherein the electrode base has an overall thickness that is at least 25% thicker than an overall thickness of the electrode tip.

11. The electrode tip assembly of claim 1, wherein the electrode base includes a generally homogeneous nickel-based composition that extends across a single material layer, and the electrode tip includes a plurality of laser deposition layers sequentially built on top of each other.

12. The electrode tip assembly of claim 1, wherein the electrode tip is made by additive manufacturing, which uses a powder bed fusion technique to melt or sinter precious metal-based powder onto the electrode base with a laser or electron beam, and then to allow the melted or sintered powder to solidify.

13. The electrode tip assembly of claim 1, wherein the electrode tip includes one or more grooves or channels formed thereon by additive manufacturing.

14. The electrode tip assembly of claim 1, wherein the electrode tip is bonded to the electrode base at an interfused boundary with a whole area connection that extends across an entire area of the interfused boundary between the electrode tip and the electrode base and does not include a weld joint.

15. The electrode tip assembly of claim 1, wherein the electrode tip assembly does not include a welded boundary between substantially dissimilar materials.

16. A spark plug, comprising:
a shell that includes an axial bore;
an insulator that is disposed in the shell axial bore and includes an axial bore;
a center electrode that is disposed in the insulator axial bore and includes an electrode body;
a ground electrode that is attached to the shell and includes an electrode body; and
the electrode tip assembly of claim 1, wherein the welding side of the electrode base of the electrode tip assembly is welded to at least one of the ground electrode body or the center electrode body.

17. An electrode strip assembly for use in manufacturing a spark plug, comprising:
an electrode base in the form of an elongated strip that includes a welding side and an additive manufacturing side; and
a plurality of electrode tips that are formed on the elongated strip in a row, wherein each of the electrode tips includes a plurality of laser deposition layers and is built on the additive manufacturing side of the elongated strip.

18. The electrode strip assembly of claim 17, wherein the electrode base includes a nickel-based material.

19. The electrode strip assembly of claim 17, wherein the plurality of electrode tips include a precious metal-based material.

20. The electrode strip assembly of claim 19, wherein the precious metal-based material is an iridium-based material.

21. An electrode sheet assembly for use in manufacturing a spark plug, comprising:
an electrode base in the form of a sheet that includes a welding side and an additive manufacturing side; and
a plurality of electrode tips that are formed on the sheet in an array of rows and columns, wherein each of the electrode tips includes a plurality of laser deposition layers and is built on the additive manufacturing side of the sheet.

22. The electrode sheet assembly of claim 21, wherein the electrode base includes a nickel-based material.

23. The electrode sheet assembly of claim 21, wherein the plurality of electrode tips include a precious metal-based material.

24. The electrode sheet assembly of claim 23, wherein the precious metal-based material is an iridium-based material.

25. A method for manufacturing a spark plug, comprising the steps of:
providing an electrode base having a welding side and an additive manufacturing side;
providing powder that includes a precious metal-based material;
positioning the electrode base in a tool such that the powder covers the additive manufacturing side;
building one or more electrode tip(s) on the additive manufacturing side of the electrode base through the use of an additive manufacturing process; and
welding the welding side of the electrode base to an electrode body.

26. The method of claim 25, wherein the building step further comprises building a single electrode tip on the additive manufacturing side of the electrode base to form an electrode tip assembly.

27. The method of claim 25, wherein the building step further comprises building a plurality of electrode tips on the additive manufacturing side of the electrode base, which is in the form of an elongated strip, to form an electrode strip assembly.

28. The method of claim 27, wherein the welding step further comprises welding the welding side of the electrode base to the electrode body while the plurality of electrode tips are still part of the electrode strip assembly.

29. The method of claim 25, wherein the building step further comprises building a plurality of electrode tips on the additive manufacturing side of the electrode base, which is in the form of a flat sheet, to form an electrode sheet assembly.

30. The method of claim 25, wherein the welding step further comprises welding the welding side of the electrode base to the electrode body while the plurality of electrode tips are still part of the electrode sheet assembly.

* * * * *